3,258,392
COLOR STABILIZED PAPER CONTAINING FLUORESCENT DYE AND TITANATE
Harold C. Brill, Riverside Gardens, Del., and Robert Steele Emslie, Chadds Ford, Pa., assignors to E. I. du Pont de Nemours and Company, Wilmington, Del., a corporation of Delaware
No Drawing. Filed Sept. 16, 1963, Ser. No. 309,347
4 Claims. (Cl. 162—162)

This invention relates to improved, color-stabilized paper products of enhanced quality and brightness and to novel methods for their production. More particularly, it relates to novel means for increasing the efficiency of optical whiteners or fluorescent dyes employed in the manufacture of cellulosic paper, and for preventing objectionable paper deterioration or discoloration.

In the manufacture of paper, optical bleaching agents (fluorescent dyes) are added to a bleached chemical pulp in order to obtain a whiter product over the paper obtained through use of chemical bleaching agents alone. Such dyes, which comprise water-soluble acid or basic dyestuffs, are added to the pulp in the beater or are surface applied and become activated by the absorption of light in the invisible ultra violet range to re-emit it in the longer wave length radiation in the visible blue range. Hence they advantageously add to the blue-white visible light already reflected, thereby rendering the paper sheet whiter and brighter when viewed in daylight, the additional colored light compensating for the inherent yellowness and dullness of bleached pulps and pigmented pulps.

Various inorganic loading materials are also incorporated in the fibrous paper web or furnish to improve or develop such special paper properties as texture, opacity, brightness, printability, reflectance, etc. These comprise various sizing agents, resins, fillers, starches and pigments, including such specific materials as clays, natural silicates, talc, titanium dioxide, etc., some of which absorb rather than reflect ultra violet light. Hence, the absorbed ultra violet light is not made available for conversion into visible light with these materials.

Again, in the paper sizing operation to provide the final paper with desired resistance against the penetration of liquids, particularly water or water solutions, aluminum sulfate is employed as a precipitant for the rosin size. Disadvantageously, when this compound is present in the paper product, it hydrolyzes slowly over a period of time and forms an acid which objectionably attacks the cellulose fibers and induces an undesired yellowing or discoloration.

It has now been found that these difficulties attending prior paper manufacture can be effectively overcome, and a principal object of this invention is to provide novel, effective means for accomplishing that object. It is among the specific objects of this invention to provide a unique combination of cellulosic paper properties and a product having high quality and brightness properties as well as novel methods for effecting its production. A further object is to increase the efficiency of fluorescent dyes employed in paper manufacture, to provide a stabilized product, and to overcome, through use and presence of a basic or alkaline type pigmenting ingredient, objectionable aluminum sulfate hydrolysis or decomposition which induces objectionable paper aging, deterioration and yellowing by reason of acidic reaction product formation. An additional specific object is to provide a unique pigmenting paper filler which in combination with organic whitening agents, optical bleaches or brightening agents will advantageously provide the novel and beneficial effects alluded to. A further object is to provide a novel paper pigmenting material which advantageously increases the efficiency of a fluorescent dye employed in paper systems over $TiO_2$ or other pigmenting ingredients. Another object is to provide a system in which additional brightness is attainable by the addition of more pigment or more dye. Other objects and advantages will be apparent from the ensuing description of the invention.

These and other objects are attained in this invention which comprises utilizing as an essential ingredient of a cellulosic paper composition and in conjunction with a fluorescent dye material an ultra-violet light-reflecting basic inorganic metal titanate, particularly a fibrous or non-fibrous alkali metal tetra- or hexatitanate.

Metal titanates adaptable for use in the invention comprise the titanates disclosed in U.S. Patents No. 2,140,236, No. 2,833,620 and No. 2,841,470, and particularly the fibrous pigmentary titanates disclosed in the pending Emslie et al. U.S. application Serial No. 279,580, filed May 10, 1963. In accordance with said U.S. 2,140,236, said titanates can be prepared by forming an intimate mixture by mutual precipitation from aqueous media, of a reactive metal compound, such as an oxide, hydroxide, or carbonate, of sodium, potassium, lithium, calcium, magnesium, barium, strontium, and zinc with a reactive titanium compound such as $TiO_2$. The composite product obtained is then filtered and washed and heated first at from 500–800° C. until titanate formation is completed, and then up to 1100° C. to develop the desired pigmentary crystalline structure. The final product, depending on the molar ratios of titanium dioxide to base metal oxide employed in the mixture, results in a meta-, tetra-, or hexatitanate of pure white color, soft, smooth texture, and uniform particle size.

U.S. 2,833,620 discloses the preparation of fibrous dialkali metal titanates corresponding to the formula $M_2O(TiO_2)_n$ in which $n$ is 6–7 and M is an alkali metal with at atomic number greater than 11, i.e. sodium, potassium, rubidium, and cesium, and by reacting a water-soluble basic oxygen-containing alkali metal compound, such as an alkali metal hydroxide, with an oxygen-containing titanium compound, such as titanium dioxide, at a temperature of at least 400° C. under a pressure of at least 200 atmospheres. U.S. 2,841,470 discloses the preparation of a titanate fiber corresponding to the general formula $M_2O(TiO_2)_n$ where $n=2-3$, by dissolving a non-fibrous alkali metal titanate in a fused, heated salt melt of an alkali metal chloride or fluoride, maintaining a portion of the molten halide saturated with the dissolved compound as the fibrous alkali metal titanate is formed, and separating the crystallized titanate fibers from the salt by water extraction.

Particles of non-fibrous metal titanate pigment ranging from 0.15 to .45 microns in diameter, and fibrous materials ranging in diameter from 0.1 to 0.35 microns with lengths up to 50 microns will prove eminently suitable for use herein in combination with fluorescent dye use. They will prove to be particularly reflective to ultra violet light in the range of 3000–4000 A. The alkali metal and alkaline earth metal titanate pigments are especially useful in that they reflect at least 90% of the ultra violet rays in the wavelength range that is effective for fluorescent dye use.

To obtain optimum benefits under the invention fibrous pigmentary titanates obtained in accordance with the disclosure of said pending U.S. application Serial No. 279,580 are employed. These can be prepared by reacting a non-fluid (substantially free of liquid or gaseous phase) reaction mixture made up of a basic oxygen-containing alkali compound, such as an alkali metal hydroxide or carbonate, and an oxygen-containing titanium compound, such as titanium dioxide, in such proportions as will yeld a fibrous titanate product containing a ratio of $TiO_2/M_2O$ (M being an alkali metal as above mentioned), ranging from 4:1 to 9:1 and preferably from 4:1 to 7:1, with calcination of the mixture at temperature ranging from 850 to 975° C. being then undertaken to obtain a fibrous pigmentary product having a particle diameter ranging from 0.1–0.6 mirons and length ranging from 10 to 100 times said diameter. Among specific, useful fibrous metal tianates of this type, those which correspond to the formulae $K_2O(TiO_2)_n$ and $Na_2O(TiO_2)_n$, with $n$ being 4–9 in each case and having the fiber length and particle diameter values just mentioned, are particularly preferred.

Fluorescent dyes or optical bleaching agents used herein comprise those well known to the paper industry. They can be used, as shown in the ensuing examples and Tables 3 and 4, in amounts ranging from 0.06 to 2% by weight, based on the paper pulps, and are mainly the following types, of which types I and VIII are the most widely used. The radical R may represent alkyl, (methyl, ethyl, propyl, etc.) or aryl (phenyl, naphthyl, etc.) amines or substituted amines; while R' may represent hydroxyl-substituted alkyl or aryl substituents. Variations of these materials are added to substrates to form dye pigments which can be physically combined in the paper systems. The term "Fluorescent Dye" is used broadly to include both high and low solubility dyes and dye pigments.

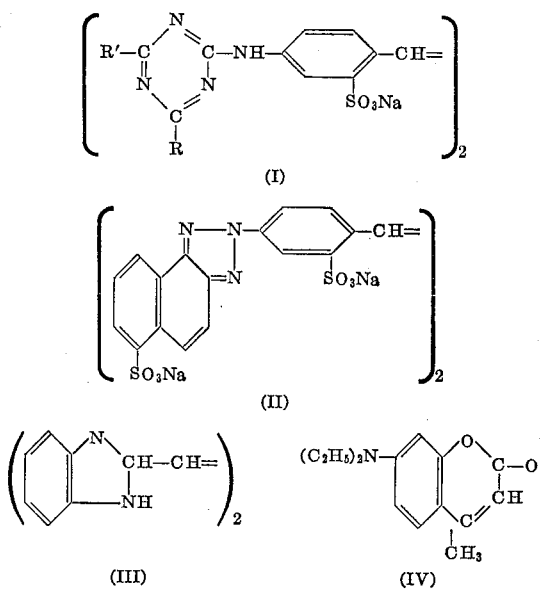

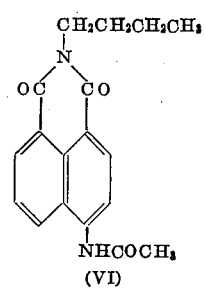

Each dye is chosen for its particular characteristic in the paper making process. Some are incorporated in the beater mix while others are added to the size press. Water solubility is a desirable property for certain applications, for example for paper surface coatings and for size press application, but high solubility is not essential since the product may be added to the beater or hydrapulper. Solubility will, of course, depend on the number and position of the $SO_3H$ groups in relation to the size of the dye nucleus in the case of an acid dye, or the amino radical ($NH_2$) in the instance of a basic dyestuff. Liquid products are attractive for use because of ease of handling, measuring and their ease of dispersion in the pulp which is an advantage for shading at the machine chest and for continuous addition.

In selecting a white dye it is generally the rule in order to avoid undesired mottled effects that the dye possess a good but non-excessive affinity for cellulose. Such effects are not visible when a sheet is viewed in daylight but only under ultra violet radiation. Highly fluorescent fibers will be shown up against a background of less fluorescent fibers. As noted above optical bleaching agents and their action are well understood. They become activated by invisible ultraviolet light and respond by re-emitting a longer wave length radiation, mainly, blue visible light. This additional colored light compensates for the inherent yellowness and dullness of bleached and pigmented pulps.

In utilizing the fluoresecnt dyestuff and titanate in the invention, they are incorporated in a conventional manner in the fibrous furnish following conventional beating and refining treatments applied to the paper pulp and in either batch or continuous paper processing operations. The stock is then charged to a Fourdrinier or cylinder machine having a wet end, consisting of a wire section on which the sheet is formed, a press section where the sheet is pressed, and a dry end consisting of a dryer section and a calendering section, where the paper sheet is dryed and polished or finished.

To a clearer understanding of the invention, the following specific examples are given which are merely illustrative of certain embodiments of the invention and wherein parts mentioned are by weight.

*Example I*

A Pulp beater was charged with 445 parts of water slurry containing 18 parts of sulphite pulp, then with 7,000 parts of distilled water and stirred for 4 minutes. 1.88 parts of fibrous potassium hexatitanate pigment having a size ranging from 40–150 microns in length and diameters ranging from 0.1 to 0.3 microns was then added and the mixture stirred for an additional 4 minutes. 1.78 parts of a 20% starch solution and 17.8 parts of 4% alum was then added, with 4 minutes of stirring being applied after the addition of each ingredient. To the resulting mixture an equivalent of 0.18 part of fluorescent dye in an aqueous solution of 10 parts was added, said dye having the following formula:

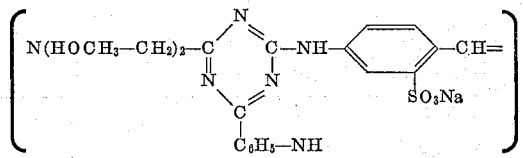

The mixture thus obtained was charged into a proportioner and diluted with distilled water to 12,600 parts. Thirteen 8" x 8" paper sheets were prepared therefrom by sheeting on a 100 mesh screen through use of a conventional type paper sheet machine, by withdrawing 970 parts for each sheet from the proportioner. The dry weight per each sheet averaged 1.45 grams which is equivalent to 25 lb. ream weight. Comparative opacity and brightness results on the felt or top side of the paper products thus obtained from the various runs undertaken, employing with sulphite pulp alone, titanium dioxide, or potassium titanate fibers are shown in the following Table 1.

TABLE 1

| Pigment | Percent Pigment Addition | Brightness [1] | | Brightness [2] With Dye |
|---|---|---|---|---|
| | | Without Dye | With Dye | |
| Pulp only | 0 | 85.9 | 94.7 | 95.1 |
| TiO² Anatase | 5 | 87.9 | 93.8 | 95.1 |
| Do | 10 | 88.2 | 93.1 | 95.1 |
| Do | 15 | 89.3 | 93.2 | 94.6 |
| TiO² Rutile | 5 | 87.1 | 90.0 | 93.6 |
| Do | 10 | 87.8 | 90.6 | 93.8 |
| Do | 15 | 88.3 | 90.7 | 94.1 |
| Potassium Titanate | 5 | 87.3 | 94.5 | 95.2 |
| Do | 10 | 88.2 | 94.5 | 95.4 |
| Do | 15 | 90.8 | 96.5 | 96.3 |

[1] Determined in accordance with the method disclosed by R. S. Hunter, Journal Optical Society of America 50, 44–48 (1960).
[2] Determined in accordance with Standard T-452 M528 of the Technical Association of the Pulp and Paper Industries Manual (TAPPI).

*Example II*

In a series of larger scale runs employing a conventional Fourdrinier machine in the paper making operation, an evaluation was made to determine the comparative effects of various pigments on the paper properties and brightness when employed in conjunction with various fluorescent bleaches as shown in Table 2 below. This evaluation was carried out on a 60 lbs. (25 x 40 x 500) basis weight paper with standard TAPPI methods employed to determine the results given. In this example sulphite pulp was beaten in a conventional paper beater to a degree of 32° Schöpper at a stock consistency of 4%. Potassium titanate pigment fibers, having lengths of 10–45 microns with an average diameter of 0.275 micron were incorporated in the pulp. Other pigmenting ingredients consisting of the alkali metal and metal titanates shown in the table had diameters of the order of .1 to .3 microns. The pulp was diluted and pumped into the head of the fourdrinier machine. The fiber-pulp slurry was flocculated with alum in the head box. Two percent alum on the dry basis pulp weight was used throughout with no starch or rosin size being used at this point. A partial quality of the fluorescent dye employed in Example I was added at this particular point in an amount equivalent to 3 lbs. per ton of paper produced. The major portion of the dye was added at its most efficient point of application, namely the size press and was added to the extent of approximately 7 lbs. per ton of paper. The total of said fluorescent dye, and the other types of dye designated in the table were then equivalent to approximately 10 lbs. per ton of paper produced. The results on the felt side obtained are listed in Table 2. Normally, as paper is formed on the Fourdrinier, the pigment content on the felt side of the sheet is greater than that on the wire side since the initial film of paper acts as a filter. If the pigment used quenches the fluorescent dye to a greater extent than the pulp, the wire side of the sheet shows greater UV reflection and greater brightness than the felt side. With anatase TiO₂ pigment the difference between sides is about 0.9 of a point while potassium titanate fibers amounts to only 0.6 of a point. The net result is that the undesirable two-sided brightness effect is greatly decreased.

*Example III*

Employing the procedures of Example I, a series of hand sheets was prepared to demonstrate the improve-

TABLE 2

| Pigment | Percent Pigment Addition | Brightness [1] | | Brightness [2] With Dye | Type of Dye Used (cols. 3 and 4) and Designation |
|---|---|---|---|---|---|
| | | Without Dye | With Dye | | |
| Pulp only | 0 | 85.9 | 94.7 | 95.1 | |
| TiO₂ Anatase | 15 | 89.3 | 93.2 | 94.6 | I with R=C₆H₅NH—; and R'=(HOCH₂—CH₂)₂N—. |
| TiO₂ Rutile | 15 | 88.3 | 90.7 | 94.1 | I with R=C₆H₅NH—; and R'=(HOCH₂—CH₂)₂N—. |
| Na₂O(TiO2)₆ | 15 | 89.3 | 97.7 | 96.2 | I with R=C₆H₅NH—; and R'=(HOCH₂—CH₂)₂N—. |
| K₂O(TiO₂)₄ (fibrous) | 15 | 90.8 | 96.5 | 96.3 | I with R=C₆H₅NH—; and R'=(HOCH₂—CH₂)₂N—. |
| K₂O(TiO₂)₆ (fibrous) | 15 | 91.1 | 98.1 | 98.3 | I with R=pSO₃NaC₆H₅NH—; and R'=(HOCH₂—CH₂)₂N—. |
| K₂O(TiO₂)₆ (fibrous) | 15 | 90.3 | 97.3 | 97.5 | II. |
| K₂O(TiO₂)₆ (fibrous) | 15 | 91.2 | 97.3 | 97.4 | III. |
| K₂O(TiO₂)₆ (fibrous) | 15 | 90.4 | 97.8 | 97.9 | IV with R=C₂H₅—. |
| K₂O(TiO₂)₆ (fibrous) | 15 | 89.8 | 96.6 | 96.5 | V. |
| K₂O(TiO₂)₆ (fibrous) | 15 | 89.7 | 95.4 | 95.5 | VI. |
| K₂O(TiO₂)₆ (fibrous) | 15 | 89.6 | 96.9 | 96.8 | VII. |
| K₂O(TiO₂)₆ (fibrous) | 15 | 90.8 | 97.3 | 97.5 | VIII. |
| CaO(TiO₂) | 15 | 88.9 | 95.7 | 95.6 | I with R=C₆H₅NH—; and R'=(HOCH₂—CH₂)₂N—. |
| (MgO)₂TiO₂ | 10 | 86.7 | 93.1 | 94.2 | I with R=C₆H₅NH—; and R'=(HOCH₂—CH₂)₂N—. |
| BaO TiO₂ | 15 | 87.9 | 95.3 | 95.4 | I with R=C₆H₅NH—; and R'=(HOCH₂—CH₂)₂N—. |
| SrO TiO₂ | 15 | 89.0 | 92.7 | 92.1 | I with R=C₆H₅NH—; and R'=(HOCH₂—CH₂)₂N—. |
| (ZnO)₂TiO₂ | 10 | 88.1 | 90.3 | 91.2 | I with R=C₆H₅NH—; and R'=(HOCH₂—CH₂)₂N—. |

[1] As determined in Table 1.
[2] As determined in Table 1.

ment obtained using potassium titanate fibers to about 0.25 micron in diameter with lengths averaging 50–60 microns in paper when in comparison to the use of commercially available clay and anatase TiO₂ fillers. The results are shown in Table 3 below. All ingredients were added to the beater mix, with the fluorescent dye used being Type I shown in column 3 with R=$C_6H_5NH-$; and R'=$(HO-C_2H_4)_2N-$. The percent of dye shown in the table is based on the effective dye added to the pulp as is the concentration of clay, anatase TiO₂, and fibrous potassium titanates. Upon examination of the table it will be seen that for equal furnish and dye concentrations, the fibrous potassium titanate advantageously yields a brighter paper.

TABLE 4

| Pigment | Percent Active Dye | Percent Brightness [1] | Percent Brightness Change |
|---|---|---|---|
| Anatase TiO₂ | Nil | 83.5 | Control |
| Do | 0.06 | 83.8 | +0.3 |
| Do | 0.12 | 84.2 | +0.7 |
| Do | 0.25 | 84.6 | +1.1 |
| Do | 0.50 | 84.8 | +1.3 |
| Potassium Titanate Fibers | Nil | 82.9 | Control |
| Do | 0.06 | 83.8 | +0.9 |
| Do | 0.12 | 83.9 | +1.0 |
| Do | 0.25 | 84.7 | +1.8 |
| Do | 0.50 | 85.1 | +2.2 |

[1] As determined by Method (2) of Table 1.

TABLE 3

| Furnish | Percent Fluorescent Dye | Percent Opacity Dry | Percent Brightness [1] | Percent Pigment in Sheet | Percent Clay in Sheet | Percent Pigment Retention |
|---|---|---|---|---|---|---|
| Pulp only | 0 | 79.5 | 85.9 | 0 | | |
| Pulp plus 40% clay | 0 | 84 | 85.5 | 0 | 6.65 | |
| | ½ | 85.5 | 91.2 | 0 | 7.38 | |
| | 1 | 85.3 | 90.7 | 0 | 7.75 | |
| | 2 | 80.5 | 91.7 | 0 | 2.69 | |
| Pulp plus 40% clay plus 20% Anatase TiO₂ | 0 | 92.0 | 89.5 | 4.14 | 6.26 | 32.6 |
| | ½ | 93.0 | 93.5 | 4.90 | 7.6 | 38.6 |
| | 1 | 92.0 | 93.5 | 4.56 | 7.9 | 36.0 |
| | 2 | 84.0 | 94.6 | 1.29 | 3.4 | 10.2 |
| Pulp plus 40% Clay | 0 | 94.1 | 89.6 | 6.41 | 10.89 | 52.5 |
| | ½ | 95.4 | 94.1 | 7.08 | 13.02 | 57.7 |
| Plus 20% fibrous Potassium Titanate | 1 | 95.3 | 94.7 | 6.81 | 12.60 | 55.8 |
| | 2 | 87.1 | 97.5 | 2.51 | 2.19 | 20.5 |

[1] As determined by Method (2) of Table 1.

*Example IV*

In the example, a series of hand sheets, of 28 lb. (25 x 40 x 500) ream weight, prepared in accordance with the procedure shown in Example I, were coated with a coating composition containing clay-starch and pigment which was applied with and without use of the Type I fluorescent dye employed in Example II. The coating composition comprised 80/20 of a commercial premium grade of clay/pigment mixture as a filler, with a 20% starch solution added at 15 lbs. starch/100 lbs. of filler. The consistencies of the titanaate-starch mix and the TiO₂— starch mix were 490 and 325 centipoise at 28° C. respectively. The coating add-on was held constant at a ream weight equivalent to 8 lbs. to yield a coated paper equivalent to 36 lbs. ream weight, and the fluorescent dye was added to the coatings in concentrations expressed as percent of solids in the coating. The results from this series are shown in the following table:

*Example V*

A series of hand sheets were prepared as in Example No. I, except the pigmentation rates were 10%, 20%, and 30% addition on a dry pulp basis to simulate furnishes for preparing paper for off-set printing. First, the pigment waas added to the sulfite pulp slurry, then the fluorescent dye, and then alum. The dry weight for sheet average 4.1 grams, equivalent to 70 lbs. ream weight.

Comparative opacity and brightness values were obtained on unwaxed and waxed sheets (averages 2 gms. 70% paraffin and 30% microcrystalline wax per sheet) from the various runs, employing sulfite pulp alone, anatase TiO₂, rutile TiO₂, and fibrous potassium titanate, respectively, as shown under Table No. 5 below. Compared to the results obtained under Table I, with 25 lbs. ream weight sheets, the brightness advantage of pigmentary potassium titanate fibers over TiO₂ was more pronounced with 70 lbs. ream weight sheets.

In addition, it was noted that the waxed papers con-

TABLE 5

| Pigment | Percent Pigment Addition | Unwaxed Sheets Brightness [1] | | Waxed Sheets Brightness [1] | |
|---|---|---|---|---|---|
| | | No Dye | With Dye | No Dye | With Dye |
| Pulp Only | 0 | 79.3 | 89.6 | 58.2 | 67.5 |
| TiO₂ Anatase | 10 | 85.3 | 94.1 | 70.5 | 78.7 |
| | 20 | 86.5 | 94.5 | | |
| | 30 | 87.7 | 94.7 | 74.7 | 81.5 |
| TiO₂ Rutile | 10 | 85.1 | 92.3 | 71.9 | 78.9 |
| | 20 | 87.1 | 93.7 | 75.0 | 81.0 |
| | 30 | 88.2 | 93.6 | 75.7 | 80.5 |
| Fibrous Potassium Titanate (0.3 micron diam. x 60 micron long) | 10 | 86.5 | 98.0 | 68.5 | 80.0 |
| | 20 | 89.5 | 100.9 | 73.9 | 86.3 |
| | 30 | 90.6 | 100.7 | 75.4 | 87.0 |

[1] Determined in accordance with the method disclosed by R. S. Hunter, Journal Optica Society of America 50, 44–48 (1960).

taining titanate fibers and fluorescent dye were much brighter than the waxed papers containing $TiO_2$ and dye. This advantage for titanate fibers is considerably useful in providing brighter waved wrapping papers than heretofore possible.

The brighter waxed papers also gave the impression to the eye of having greater opacity.

A suitable means of obtaining maximum brightness of waxed papers for wrapping would be to apply titanate fibers as a coating, with dye being added on the surface of the coating in a separate, size press application. Other methods would be to add the dye in the coating or in the beater or hydrapulper.

It is evident, as the values and results shown in the above examples demonstrate, the use of the metal titanate pigments in combination with a fluorescent dye in paper making, as contemplated in this invention, affords outstanding benefits and desirable effects which are not realizable with prior ultra violet light-absorbing pigmenting materials. While the pigmenting titanate has been indicated as employable in certain concentrations and as the sole pigmenting ingredient in the examples, obviously and, if desired, such amounts can be varied and that it can be used in admixture with $TiO_2$ or other ultra violet light absorbing pigment in order to enhance and improve fluorescent dye efficiency and paper quality and brightness to whatever extent desired. Advantageously, alkali metal titanates possess a residual alkalinity which will neutralize acidic products formed on alum hydrolysis and prevent any undesired attack on the cellulose with its consequent paper yellowing.

As shown in the foregoing examples the fluorescent dyes or bleaches can be incorporated either at the beater or in the size press after the paper has been formed. Advantageously, an amount of approximately 3 lbs. of dye per ton of paper at the beater and approximately 7 lbs. per ton of paper produced on the size press can be added. Although specific fluorescent dyes have been mentioned as utilizable, it will be understood that use is contemplated of any dye which requires ultra violet light to function and which is adaptable for use in paper making.

The use of fluorescent dye in combination with pigments reflecting ultra violet radiation in the effective wavelength range are particularly useful in those applications where the need for ultra violet light in quantities is required in a particular process. For example, in reproduction paper, where the use of ultra violet light is required in the chemical transformation of the dyes within the paper, the presence and use of an ultra violet reflecting metal titanate pigment will be particularly effective, since for any given concentration of ultra violet radiation, the speed of the paper can be accelerated due to the ultra violet light that is reflected back to produce the image of a much faster rate. The efficiency of fluorescent paints, for example, is also improved by the presence of the titanate in combination with the dye and dye pigments because of their fluorescent character and reliance on the conversion of ultra violet light for their properties.

We claim:
1. A color stabilized paper containing cellulosic fibers, from 0.06 to 2% by weight of an optical whitening fluorescent dye, and as a brightening agent for said dye and the pigmenting ingredient for said paper, a particulate basic inorganic metal titanate corresponding to the formula $M_2O(TiO_2)_n$ in which M is a metal selected from the group consisting of Na, K, Li, Rb, Cs, Ca, Mg, Ba, Sr and Zn, and $n$ equals 4 to 9, said titanate being reflective to ultraviolet light in the range of 3000 to 4000 A. and consisting essentially of particles having a diameter ranging from 0.1 to 0.6 microns.

2. A color stabilized paper containing cellulosic fibers, from 0.06 to 2% by weight of an optical whitening fluorescent dye, and as a brightening agent for said dye and the pigmenting ingredient for said paper a particulate fibrous basic potassium titanate corresponding to the formula $K_2O(TiO_2)_n$ in which $n$ equals 4 to 9, said titanate being reflective to ultraviolet light in the range of 3000 to 4000 A. and consisting essentially of particles having a diameter ranging from 0.1 to 0.6 microns and a length ranging from 10 to 100 times said diameter.

3. A color stabilized paper containing cellulosic fibers, from 0.06 to 2% by weight of an optical whitening fluorescent dye, and as a brightening agent for said dye and the pigmenting ingredient for said paper a particulate fibrous basic sodium titanate corresponding to the formula $Na_2O(TiO_2)_n$ in which $n$ equals 4 to 9, said titanate being reflective to ultraviolet light in the range 3000 to 4000 A. and consisting essentially of particles having a diameter ranging from 0.1 to 0.6 microns and a length ranging from 10 to 100 times said diameter.

4. A color stabilized paper containing cellulosic fibers, from 0.06 to 2% by weight of an optical whitening fluorescent dye, and as a brightening agent for said dye and the pigmenting ingredient for said paper a particulate fibrous basic calcium titanate corresponding to the formula $CaO(TiO_2)_n$ in which $n$ equals 4 to 9, said titanate being reflective to ultraviolet light in the range of 3000 to 4000 A. and consisting essentially of particles having a diameter ranging from 0.1 to 0.6 microns.

References Cited by the Examiner

UNITED STATES PATENTS

| | | | |
|---|---|---|---|
| 2,841,470 | 7/1958 | Berry | 23—51 |
| 2,924,549 | 2/1960 | Klein et al. | 162—162 |
| 3,088,949 | 5/1963 | Moser et al. | 162—162 |
| 3,129,105 | 4/1964 | Berry et al. | 106—299 X |

DONALL H. SYLVESTER, *Primary Examiner.*

S. L. BASHORE, *Assistant Examiner.*